United States Patent
Cui et al.

(10) Patent No.: US 10,397,825 B2
(45) Date of Patent: *Aug. 27, 2019

(54) PROBE MECHANISM FOR ENHANCING EXPLICIT CONGESTION NOTIFICATION USABILITY

(71) Applicant: AT&T Intellectual Property I, L.P., Atlanta, GA (US)

(72) Inventors: Zhi Cui, Sugar Hill, GA (US); Kadangode K. Ramakrishnan, Berkeley Hgts, NJ (US); Robert C. Streijl, Brighton, MA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/877,100

(22) Filed: Jan. 22, 2018

(65) Prior Publication Data
US 2018/0146396 A1    May 24, 2018

Related U.S. Application Data

(63) Continuation of application No. 14/831,451, filed on Aug. 20, 2015, now Pat. No. 9,936,418, which is a
(Continued)

(51) Int. Cl.
*H04W 28/02*    (2009.01)
*H04W 48/18*    (2009.01)
(Continued)

(52) U.S. Cl.
CPC ....... *H04W 28/0284* (2013.01); *H04L 43/103* (2013.01); *H04W 48/06* (2013.01); *H04W 48/18* (2013.01); *H04L 41/0893* (2013.01)

(58) Field of Classification Search
CPC ............. H04W 28/0284; H04W 48/18; H04L 43/103; H04L 47/35
See application file for complete search history.

(56) References Cited

U.S. PATENT DOCUMENTS

| 6,278,982 B1 | 8/2001 | Korhammer et al. |
| 6,850,497 B1 | 2/2005 | Sigler et al. |

(Continued)

FOREIGN PATENT DOCUMENTS

| CN | 101112063 A | 1/2008 |
| KR | 10-0829427 A | 8/2003 |

OTHER PUBLICATIONS

Tsaoussidis, et al. "TCP-Probing: Towards an Error Control Schema with Energy and Throughout Performance Gains", 2000, 10 pages.
(Continued)

*Primary Examiner* — Asad M Nawaz
*Assistant Examiner* — Syed Ali
(74) *Attorney, Agent, or Firm* — Amin, Turocy & Watson, LLP

(57) ABSTRACT

Explicit congestion notification (ECN) data that is utilized in a core portion of a cellular communication network has known issues associated with a first use scenario and an infrequent use scenario. A probe comprising probe data and a data structure for storing certain ECN data can be transmitted in order to mitigate these issues. Transmitting the probe in response to a communication session being established with a device of a network can mitigate the first use issue. Transmitting the probe in response to expiration of a probe timer in connection with a network traffic idle period can mitigate the infrequent use scenario.

20 Claims, 10 Drawing Sheets

Related U.S. Application Data continuation of application No. 14/064,792, filed on Oct. 28, 2013, now Pat. No. 9,148,814.

(51) Int. Cl.
*H04W 48/06* (2009.01)
*H04L 12/26* (2006.01)
*H04L 12/24* (2006.01)

(56) References Cited

U.S. PATENT DOCUMENTS

| | | | |
|---|---|---|---|
| 7,200,116 B2 | 4/2007 | Kobayashi | |
| 7,369,498 B1 | 5/2008 | Ma et al. | |
| 7,426,183 B2 | 9/2008 | Karsten et al. | |
| 7,457,245 B2 | 11/2008 | McAlpine et al. | |
| 7,468,947 B2 | 12/2008 | Mannal et al. | |
| 7,773,519 B2 | 8/2010 | Prabhakar et al. | |
| 7,961,621 B2 | 6/2011 | Bergamasco et al. | |
| 8,130,655 B2 | 3/2012 | Foottit et al. | |
| 8,335,161 B2 | 12/2012 | Foottit et al. | |
| 8,363,551 B2 | 1/2013 | Jacquet et al. | |
| 8,427,949 B2 | 4/2013 | Yang | |
| 8,498,210 B2 | 7/2013 | Briscoe et al. | |
| 8,576,714 B2 * | 11/2013 | Yang | H04B 7/155 370/235 |
| 8,630,256 B2 | 1/2014 | Tinnakornsrisuphap et al. | |
| 8,811,178 B2 | 8/2014 | Kutscher et al. | |
| 8,902,739 B2 | 12/2014 | Tarraf et al. | |
| 8,923,115 B2 | 12/2014 | Pelletier et al. | |
| 8,964,539 B2 | 2/2015 | Susitaival et al. | |
| 9,007,914 B2 | 4/2015 | Leung et al. | |
| 9,013,987 B2 | 4/2015 | Zhu | |
| 9,020,498 B2 | 4/2015 | Stanwood et al. | |
| 9,025,453 B2 | 5/2015 | Ludwig et al. | |
| 9,462,591 B2 * | 10/2016 | Zakrzewski | H04W 28/0215 |
| 2004/0044761 A1 | 3/2004 | Phillipi et al. | |
| 2005/0047340 A1 | 3/2005 | Babiarz et al. | |
| 2007/0028003 A1 | 2/2007 | Rudkin | |
| 2007/0076599 A1 | 4/2007 | Ayyagari et al. | |
| 2009/0161546 A1 | 6/2009 | Key et al. | |
| 2011/0075563 A1 | 3/2011 | Leung et al. | |
| 2012/0120798 A1 | 5/2012 | Jacque et al. | |
| 2012/0257505 A1 | 10/2012 | Kutscher et al. | |
| 2013/0084878 A1 | 4/2013 | Chen et al. | |
| 2013/0114448 A1 | 5/2013 | Koo | |
| 2013/0170435 A1 * | 7/2013 | Dinan | H04L 45/50 370/328 |
| 2014/0126502 A1 * | 5/2014 | Westberg | H04W 72/1247 370/329 |
| 2014/0376426 A1 * | 12/2014 | Boudreau | H04L 47/41 370/294 |
| 2015/0029887 A1 | 1/2015 | Briscoe et al. | |
| 2015/0117230 A1 * | 4/2015 | Cui | H04W 28/0284 370/252 |
| 2015/0201394 A1 * | 7/2015 | Qu | H04W 4/029 455/456.1 |
| 2015/0237512 A1 * | 8/2015 | Chang | H04W 76/10 370/328 |
| 2016/0014030 A1 * | 1/2016 | Thyni | H04W 36/0005 370/237 |
| 2016/0234698 A1 * | 8/2016 | Thyni | H04W 24/02 |
| 2016/0359750 A1 * | 12/2016 | Miklos | H04L 47/24 |

OTHER PUBLICATIONS

Salim, et al. "Performance Evaluation of Explicit Congestion Notification (ECM) in IP Networks", http://tools.ielf.org/html/rfc2884, Jul. 2000, 18 pages.

Ramakrishnan, et al., "The Addition of Explicit Congestion Notification (ECN) to IP", Sep. 2001, http://www.hjp.al/doc/rfc/rfc3168.html, 55 pages.

Notice of Allowance dated May 21, 2015 for U.S. Appl. No. 14/064,792, 31 pages.

Office Action dated May 19, 2016 for U.S. Appl. No. 14/831,451, 57 pages.

Office Action dated Nov. 16, 2016 for U.S. Appl. No. 14/831,451, 57 pages.

Office Action dated Jun. 8, 2017 for U.S. Appl. No. 14/831,451, 63 pages.

Notice of Allowance dated Oct. 23, 2017 for U.S. Appl. No. 14/831,451, 43 pages.

U.S. Appl. No. 14/064,792, filed Oct. 28, 2013, U.S. Pat. No. 9,148,814.

U.S. Appl. No. 14/831,451, filed Aug. 20, 2015, U.S. Pat. No. 9,936,418.

* cited by examiner

PROBE MECHANISM FOR ENHANCING EXPLICIT CONGESTION NOTIFICATION USABILITY

CROSS-REFERENCE TO RELATED APPLICATIONS

This application is a continuation of, and claims priority to each of, U.S. patent application Ser. No. 14/831,451, filed on Aug. 20, 2015, and entitled "PROBE MECHANISM FOR ENHANCING EXPLICIT CONGESTION NOTIFICATION USABILITY," which is a continuation of U.S. patent application Ser. No. 14/064,792 (now U.S. Pat. No. 9,148,814), filed on Oct. 28, 2013, and entitled "PROBE MECHANISM FOR ENHANCING EXPLICIT CONGESTION NOTIFICATION USABILITY." The entireties of these applications are hereby incorporated by reference herein.

TECHNICAL FIELD

The present application relates generally to utilizing a schedule-triggered probe for solving a known "first usage" issue of explicit congestion notification (ECN), for instance, utilizing data carried in ECN bits of a packet's IP header for selecting among various available wireless access networks to carry network traffic.

BACKGROUND

Various third generation partnership project (3GPP) standards such as universal mobile telecommunications system (UMTS) standards and long term evolution (LTE) standards allow for use of explicit congestion notification (ECN) data that is defined by Internet engineering task force (IETF). This usage of ECN in 3GPP accesses is for rate limiting of data by applications. ECN data is employed on the provider side of many cellular communication networks. For example, some cellular networks utilize ECN data in order to affect transmission control protocol (TCP)/Internet protocol (IP) data flows between various provider-side devices. Recently, the use of ECN data has been extended to certain user datagram protocol (UDP) services implemented on the provider-side of cellular based networks.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
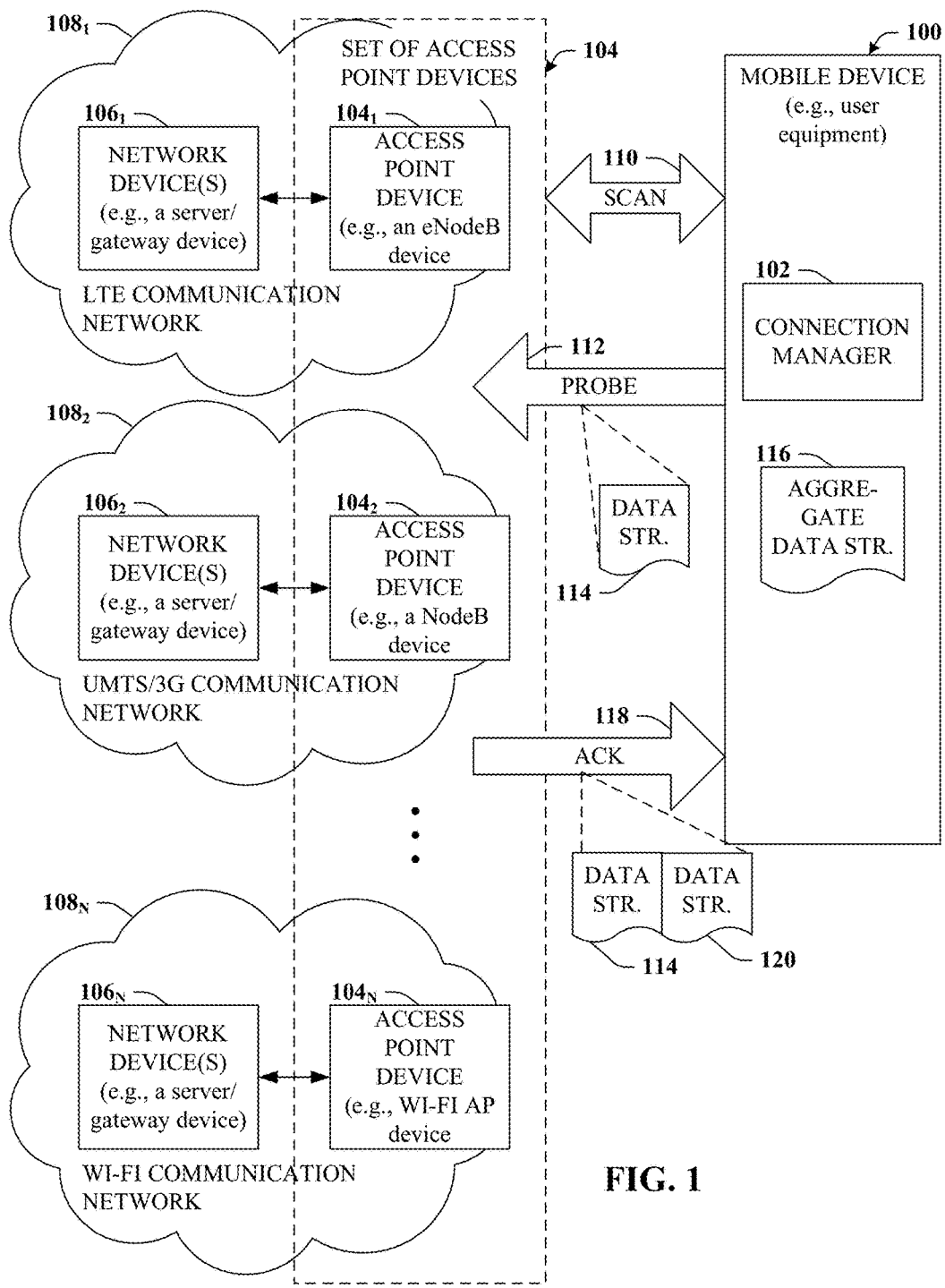
FIG. 1 illustrates a block diagram of an example mobile device that can provide for utilizing a probe for discovering network congestion data such as data associated with explicit congestion notification (ECN) in accordance with certain embodiments of this disclosure.

Mobile traffic has been growing at a very fast pace and that growth trend is expected to continue. To meet the mobile traffic growth as well as to improve end user experience, mobile service providers are actively seeking mechanisms to improve system capacity and end user experience in a manner that can leverage all available radio technologies, including, for example, cellular networks (e.g., universal mobile telecommunications system (UMTS), long term evolution (LTE), etc.), and non-cellular networks such as wireless fidelity (Wi-Fi), or others.

Current communication network frameworks typically designate network selection (and/or data traffic to be carried over a given network) based on availability or based on radio frequency (RF) conditions. Thus, one such mechanism to improve conditions can relate to intelligently steering user traffic to a best radio network in terms of less congestion. Such intelligent network selection can take into account real-time radio congestion condition, which can ultimately improve system performance and user experience.

Another trend in the industry indicates that the number or proportion of user devices that are smart devices is increasing. Further, as smart devices are becoming more intelligent about and aware of services, mobility state (e.g., moving speed), performance measurements or metrics, battery state, and so forth at the device, it becomes increasingly important and therefore is becoming an industry trend for these smart devices to make intelligent selection as to what data applications should steer to which network. Moreover, such can be based on the mentioned intelligence at the device, as well as based on the conditions of radio networks.

However, in order to provide a mechanism that can facilitate intelligent network selection and/or intelligently steering network traffic, certain challenges arise. For example, if a user device is to select one network from among several available networks to use in transmitting (or receiving) application data and to do so based on a congestion state of these available networks, then the user device typically must be able to receive information associated with the various congestion states and/or make a determination about the various congestions states of the available networks.

As noted in the background section, explicit congestion notification (ECN) data exists, and is used by previous systems in order to meet other challenges that exist in the industry. In particular, ECN data has been employed to identify congestion states of networks, but such data is typically only used by provider-side network devices (e.g., in a core portion of the network). Accordingly, many previous solutions do not utilize this ECN data at the user-side (e.g., radio access network (RAN) portion) such as at a mobile device or other user equipment (UE).

Therefore, extending the use of ECN data to non-cellular communication networks (e.g., Wi-Fi) as well as to devices at the RAN portion of a communication network (e.g., mobile devices) can provide numerous advantages. For example, such can be implemented with little or no change to existing cellular platforms (e.g., UMTS, LTE, etc.) and can provide many additional features that can be leveraged by applications executing on a smart mobile device, such as the feature of intelligently routing application traffic based on network congestions indicator(s) or other congestion data.

In other words, an enabler or connection manager for smart mobile devices can make intelligent network selection across available cellular (e.g., UMTS, LTE, etc.) networks and other available networks (e.g., Wi-Fi, worldwide interoperability for microwave access (WiMAX), etc.) using ECN data. In some embodiments, this intelligent selection can apply to selection of the particular network that will be used to transmit or receive data associated with applications executing on the mobile device and can be based on real time information associated with radio network congestion conditions. The mechanism utilized to determine the radio network congestion conditions can be ECN data that can be employed at the mobile device as a general-purpose, qualitative, access network-agnostic congestion indicator.

However, solutions that rely on such extension of ECN data must contend with known issues associated with ECN data. Specifically, networks that utilize ECN data must contend with a known "first usage" issue and a known "stale" issue. Both issues arise because most implementations transmit ECN data in the header of Internet protocol (IP) packets of live user/application traffic. Thus, if two devices have not seen much traffic over a period of time, either because an interaction between the two devices was established some time ago, or because an existing session had limited traffic by which updates can occur, then existing ECN data for either of these devices might be non-existent or stale. As one result, the purpose of such ECN data (e.g., determining congestion states for various portions of a network) cannot be achieved reliably.

The disclosed subject matter can mitigate these and other issues. For example, the disclosed subject matter can mitigate both "first usage" and low frequency usage scenarios in which current ECN data might be stale. Such can be accomplished by transmitting a lightweight two-way probe that is based on ECN. For example, the probe can be a small transmission control protocol (TCP)/IP packet(s) that propagates to/from user equipment (e.g., a mobile device) and a network server via an access point device. In some embodiments, the network server can be substantially any server device that can process a TCP/IP packet, but will typically be situated in a core network portion of a communication network.

Thus, the two-way probe can be transmitted from the mobile device to an access point of the communication network (and/or to other radio access network (RAN) portions of the communication network), forwarded to the network device, and then returned to the mobile device. The probe can include certain ECN-based congestion data. For instance, the probe can include a data structure that can store ECN data representing congestion states of a network. All or a portion of the devices that are traversed by the probe can use data included in the probe to determine a congestion state for a previously traversed segment of the network, and update or mark the data structure according to that determined congestion state. Moreover, triggered by the receipt of the probe packet from the UE, or other types of triggers, the network server can send a downlink probe packet to UE to create a two-way probe. As a result, the congestion information collected can include data associated with both uplink traffic segments and downlink traffic segments.

Probe for Discovering Network Congestion Status

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, mobile device 100 is depicted. Mobile device 100 can provide for utilizing a probe for discovering network congestion data such as data associated with explicit congestion notification (ECN). Such can advantageously mitigate known issues associated with the use of ECN data such as a first usage issue and a stale usage issue. Mobile device 100 can represent any suitable user equipment (UE) that can access data or services of a communication network provider, either cellular or non-cellular, can support connection with multiple networks, and can include a memory to store instructions and, coupled to the memory, a processor that facilitates execution of the instructions to perform operations. Examples of the memory and processor can be found with reference to FIG. 10. It is to be appreciated that the computer 1002 of FIG. 10 can represent a service device of a communications network or a user equipment device and can be used in connection with implementing one or more of the systems or components shown and described in connection with FIG. 1 and other figures disclosed herein.

In particular, mobile device 100 can include connection manager 102 that can be configured to facilitate, either alone or in conjunction with other components, all or a portion of the operations detailed herein with respect to mobile device 100.

Mobile device 100 can be configured to identify a set of access point devices $104_1$-$104_N$ that facilitate access to network devices $106_1$-$106_N$ of associated communication networks $108_1$-$108_N$. Set of access point devices 104, network devices 106, and communication networks 108 can include substantially any number, N, of individual access point devices $104_1$-$104_N$, individual network devices $106_1$-$106_N$, and individual communication networks, which are hereinafter respectively referred to, either individually or collectively, as access point device(s) 104, network device(s) 106, or communication network(s) 108 with appropriate subscripts generally employed only when instructive or convenient to highlight various distinctions or to better impart the disclosed concepts.

As one example, access point device $104_1$ can be an eNodeB device that provides mobile device 100 access to network device $106_1$ of an LTE communication network $108_1$. As another example, access point device $104_2$ can be a NodeB device that provides mobile device 100 access to network device $106_2$ of a 3G or UMTS communication network $108_2$. As still another example, access point device $104_N$ can be a Wi-Fi access point (AP) device that provides mobile device 100 access to network device $106_N$ of a Wi-Fi communication network $108_N$. In these and other examples, network devices 106 can relate to server devices or gateway devices that reside in a core network of the associated communication network 108. Thus, network devices 106 and access point devices 104 can represent the boundary between the core network of associated communication networks 108 and the radio access network (RAN) of associated communication networks 108, the latter of which can include mobile device 100. It is understood that examples provided herein with respect to access point device(s) 104 are merely exemplary and other suitable device types and/or technologies are considered to be within the scope of the appended claims in certain embodiments.

In some embodiments, set of access point devices 104 can include all the various access point devices 104 that are in range of or otherwise available to serve mobile device 100, which is further detailed in connection with FIG. 2. Identification of available of access point devices 104 can be accomplished in connection with scan 110. In some embodiments, scan 110 can relate to a network selection scan performed by mobile device 100. In some embodiments, scan 110 can relate to a scan that differs from a network selection scan, such as a scan of networks with which connections currently exist.

Figure 2:
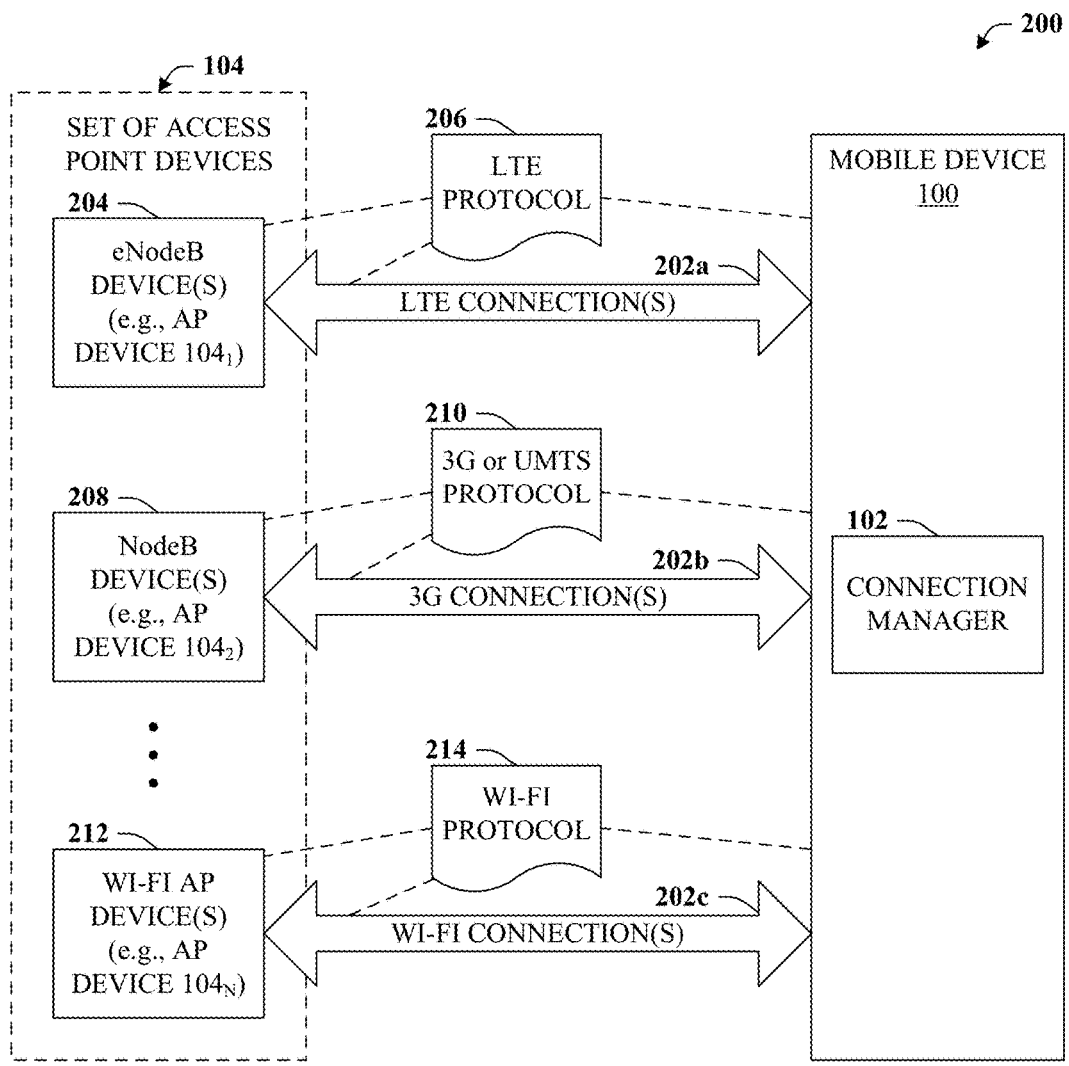
FIG. 2 illustrates a block diagram of an example system that illustrates multiple connections between the mobile device and multiple access points in accordance with certain embodiments of this disclosure.

While still referring to FIG. 1, but turning now as well to FIG. 2, system 200 is depicted. System 200 illustrates multiple connections between the mobile device 100 and multiple access points 104. For example, consider a network selection scan (e.g., scan 110) that is performed at mobile device 100 in which three eNodeB devices 204 are discovered and/or in range. Mobile device 100 might select one or more of those eNodeB devices 204 and establish one or more LTE connections 202a in accordance with an LTE protocol 206. Further suppose the network selection scan indicates two NodeB devices 208 that are in range or otherwise available, at least one of which can be leveraged to establish 3GPP connection 202b that operates according to 3G UMTS protocol 210. Additionally, or alternatively, mobile device can establish Wi-Fi connection 202c according to Wi-Fi protocol 214 with one or more Wi-Fi access point devices 212. As used herein, connection 202a-202c, can be referred to either individually or collectively as connection(s) 202. Connection 202 can relate to a communication session that has been established between mobile device 100 and a device of communication network 108, such as access point device 104 or network device 106.

It is understood that other connections 202 can exist in accordance with any suitable protocol. However, this example illustrates that mobile device 100 can have concurrent connections 202 with multiple access point devices 104. As a common example, mobile device 100 can have a connection 202a and/or connection 202b established with a cellular network (e.g., LTE, UMTS, etc.) and a connection 202c established with a non-cellular network (e.g., Wi-Fi).

Still referring to FIG. 1, because concurrent connections 202 can exist among multiple available networks 108, intelligent selection of a particular network 108 to use when transmitting data can be advantageous. For example, if it is determined that communication networks $108_1$ and $108_2$ associated with access point devices $104_1$ and $104_2$ are congested, but that communication network $108_N$ associated with access point devices $104_N$ is not congested, then such information can be leveraged by mobile device 100 in a manner that can, e.g., increase data throughput and improve the experiences of a user.

However, as previously detailed, in some cases current information relating to network congestion as provided by ECN data can be old or non-existent. For example, such data might be old if a connection 202 or other communication session has been established, but for which little or no traffic has been transmitted via that connection 202. As another example, such ECN data might be non-existent in cases where connection 202 is newly established.

Thus, mobile device 100 can be configured to transmit probe 112 to access point device 104. In some embodiments, mobile device 100 can be configured to transmit probe 112 via access point device 104 to network device 106. In some embodiments, probe 112 can be transmitted to any or all of the access points $104_1$-$104_N$, typically those access points 104 for which connection 202 has been established. In some embodiments, probe 112 can be transmitted to any or all of the network devices $106_1$-$106_N$ via access point devices $104_1$-$104_N$. In either case, probe 112 can be transparent, but can be updated by any suitable device by which it is received. Probe 112 can include probe data that can be employed to determine congestion. For example, probe data can include time stamp information, information associated with packet loss, information associated with retransmission, information associated with performance, or the like. Probe 112 can also include data structure 114 that can be associated with ECN techniques or data, and is further detailed herein. Data structure 114 can conform to ECN standards and can be mapped to an appropriate portion of aggregate data structure 116, which is further detailed with reference to FIG. 3. A copy of aggregate data structure 116 can be individually maintained by various devices of network 108 in order to retain congestion data that is discovered via probes or other ECN-based techniques.

Mobile device 100 can be further configured to receive acknowledgement (ACK) 118. ACK 118 can be received from access point 104 and/or via access point 104 (e.g., after being propagated from network device 106 in response to receipt of probe 112). ACK 118 can include data structure 114 that is populated with congestion data that corresponds to ECN data relating to communication network 108 associated with access point device 104. ACK 118 can also include second data structure 120 that is populated with congestion data that corresponds to ECN populated at network device 106. For example, data structure 114 that is transmitted along with probe 112 can arrive at various devices of network 108 that can update data structure 114 based on ECN data or other congestion data. In this case, data structure 114 is updated by access point device 104 upon arrival, then probe 112 is forwarded to network device 106. ACK 118 can be transmitted via a return path through an acknowledgement packet and, upon arrival, mobile device 100 can retrieve ECN data indicative of congestion state of the network in uplink direction. In some embodiments, triggered by the receipt of the probe 112 from the mobile device 100, or other types of triggers, the network device 106 can send a downlink probe packet to mobile device 100. If network 108, e.g. a cellular RAN, experiences network congestion in the downstream direction, it will mark the IP packet header with CE and when this probe packet initiated by the server arrives at the device, UE now knows about the network congestion status in downlink direction as well. FIG. 4 provides an illustrated example, while FIG. 3 provides an example of aggregate data structure 116.

Figure 3:
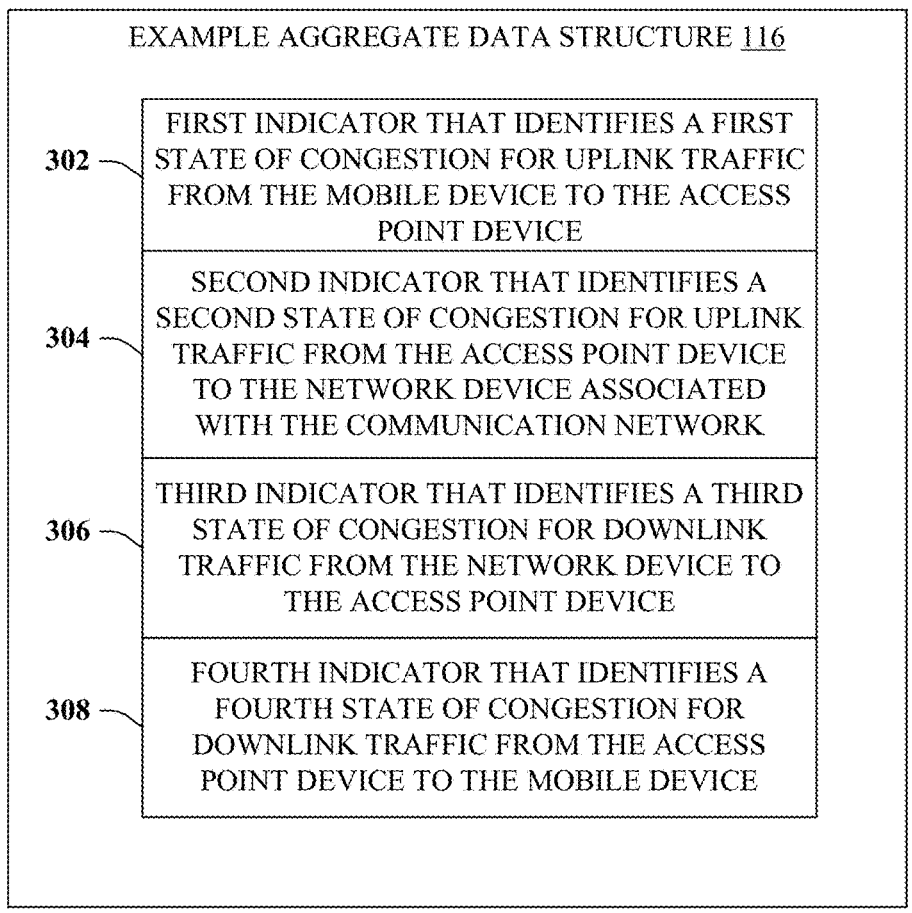
FIG. 3 illustrates a block diagram of an example of the aggregate data structure that can be updated based on ECN probes in accordance with certain embodiments of this disclosure.
Figure 4:
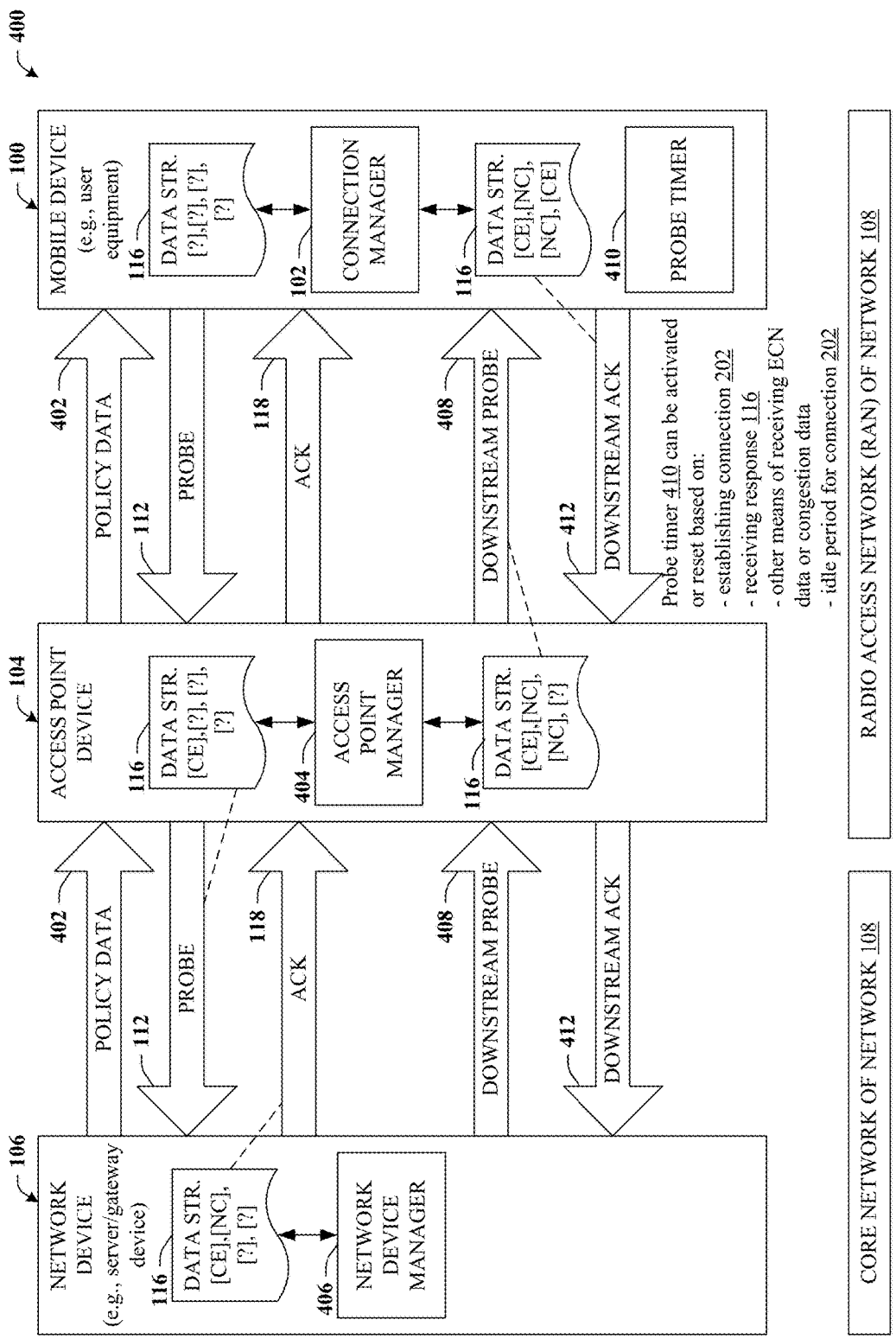
FIG. 4 illustrates a block diagram of an example system that can provide for additional aspects or features in connection with utilizing a probe for discovering ECN-based congestion data in accordance with certain embodiments of this disclosure.

Turning now to FIG. 3, illustration 300 is depicted. Illustration 300 provides an example of the aggregate data structure 116. In particular, aggregate data structure 116 can include various fields with various indicators of congestion states for various segments of a network 108. These indicators can be populated based on markings of data structure 114 of probe 112 in accordance with ECN techniques. It is appreciated that aggregate data structure 116 can include other suitable indicators not described in this example, and not all indicators need be included in aggregate data structure 116.

For example, aggregate data structure 116 can include first indicator 302 that identifies a first state of congestion for uplink traffic from the mobile device 100 to the access point device 104. First indicator 302 can be updated or marked based on probe data included in probe 112 upon arrival at access point device 104. Such might be accomplished by analyzing delay associated with probe 112 or by other suitable means, e.g. packet loss. Aggregate data structure 116 can include second indicator 304 that identifies a second state of congestion for uplink traffic from the access point device 104 to the network device 106 associated with communication network 108. Second indicator 304 can be marked by network device 106 upon receipt of probe 112. Aggregate data structure 116 can include third indicator 306 that identifies a third state of congestion for downlink traffic from network device 106 to access point device 104. Third indicator can be marked by access point device 104 upon receipt of a downlink probe (further detailed with reference to FIG. 4) transmitted by network device 106, potentially in response to receipt of probe 112. Aggregate data structure 116 can also include fourth indicator 308 that can identify a fourth state of congestion for downlink traffic from access point device 104 to mobile device 100, which can be marked upon receipt of the downlink probe at mobile device 100.

With reference now to FIG. 4, system 400 is depicted. System 400 can provide for additional aspects or features in connection with utilizing a probe for discovering network congestion indication carried in the ECN-bit. System 400 can include mobile device 100, access point device 104, and network device 106. In some embodiments, mobile device 100 can receive policy data 402 that can relate to a policy for network selection in connection with the ECN-based congestion data that can be included in data structure 114 and/or aggregate data structure 116. Policy data 402 can be received from access point device 104 and can originate from network device 106 or another device included in a core network portion of network 108.

Policy data 402 can be employed by mobile device 100 in connection with network selection when multiple networks are available to mobile device. Thus, if an LTE network, a UMTS network, and a Wi-Fi network are all available to mobile device 100, policy data 402 can be employed to not only assist in selecting among these various networks for certain data traffic, but to do so in connection with congestion data. Policy data 402 can include information for selecting a network in the general case that selects a network for forthcoming traffic as well as for specific cases such as selecting a network for specific types of traffic (e.g., selecting LTE or Wi-Fi for streaming video applications but a different network for other applications).

As noted previously, mobile device 100 and/or connection manager 102 can facilitate transmission of probe 112 that can include probe data (e.g., timing, performance, etc.) and data structure 114 that maps to an appropriate portion of aggregate data structure 116. As depicted, aggregate data structure 116 at this stage has not yet been populated with congestion state data. However, access point device 104 can receive, from mobile device 100, probe 112 comprising the probe data and data structure 114 for congestion data associated with ECN for a communication network 108 associated with access point device 104. Access point device 104 (e.g., in conjunction with access point manager 404) can determine a first state of congestion for uplink traffic from mobile device 100 to access point device 104 based on probe data (e.g., based on packet loss, retransmission, timing, performance, etc. of probe 112). Moreover, access point device 104 can update or mark data structure 114 in accordance with the first state of congestion. For instance, in this example, access point manager 404 marks data structure 114 with the indicator "CE" denoting that congestion is experienced. Likewise, a portion of aggregate data structure 116 (e.g., first indicator 302) can be updated with the same or similar indicator to denote congestion is experienced in the uplink direction from mobile device 100 to access point device 104.

In turn, access point device 104 can transmit probe 112 (with the updated data structure 114 and suitable probe data) to network device 106. Network device 106 can also include a similar type of manager, in this case network device manager 406, which can perform similar analysis to determine a state of congestion for uplink traffic between access point device 104 and network device 106, and mark a relevant portion of aggregate data structure 116 appropriately. In this example, network device 106 writes "NC" to another portion of aggregate data structure 116 (e.g., second indicator 304), which denotes that no congestion is experienced in the uplink direction between access point device 104 and network device 106. In addition, network device 106 can transmit ACK 118 in response to receipt of probe 112. ACK 118 can include response data relating to performance or timing and the updated aggregate data structure 116 available to network device 106.

Access point device 104 can receive, from network device 106, ACK 118 and can forward ACK 118 to mobile device 100. Since ACK 118 can include information relating to the updated state of aggregate data structure 116 at network device 106, ACK 118 can be employed to update similar aggregate data structures 116 retained at access point device 104 and mobile device 100, respectively. In particular, upon receipt of ACK 118, access point device 104 and mobile device 100 can update respective aggregate data structure 116 with a complete picture of the congestion states in the uplink direction. For example, at this point, all aggregate data structures 116 can mark first indicator 302 with "CE" and second indicator 304 with "NC".

In addition, upon receipt of probe 112, and potentially concurrent with transmitting ACK 118, network device 106 can also initiate downstream probe 408. Downstream probe 408 can be substantially similar to probe 112, but delivered in the downstream direction and therefore useful to leverage ECN data in that direction. In this example, there is not sufficient congestion between network device 106 and access point device 104, so access point device 104 marks downstream probe 408 (e.g., data structure 114) with "NC" and similar information is copied to a relevant portion (e.g., third indicator 306) of aggregate data structure 116. However, sufficient congestion does exist between access point device 104 and mobile device 100 in the downstream direction. Thus, mobile device 100 updates the remaining two portions of aggregate data structure 116 upon receipt of downstream probe 408. It is appreciated that mobile device 100 now has access to very specific ECN-based congestion data that is pertinent to both uplink and downlink directions of communication network 108 as well as to specific segments of communication network 108. Such information can be utilized to determine whether or not network 108 is suitable for selection for all or certain types of data traffic. For example, in this case, where aggregate data structure 116 indicates both uplink and downlink segments between access point device 104 and mobile device 100 (e.g., the RAN portion of network 108) are in a state of congestion (e.g., associated portion of aggregate data structure 116 marked with "CE"), it is likely that mobile device 100 will select (e.g., based on policy data 402) a different network 108 (e.g., Wi-Fi over LTE or vice versa) to carry traffic for any given application executing on mobile device 100 or at least for certain applications.

In some embodiments, mobile device 100 can transmit downstream ACK 412 in response to receiving downstream probe 408. Downstream ACK 412 can be transmitted to network device 106 via access point device 104 and can include the updated version of aggregate data structure 116. Thus, both access point device 104 and network device 106 can be provided all information associated with the congestion data that is available to mobile device 100 such as the updated aggregate data structure 116.

It is noted that in some embodiments, sufficient ECN-based data can be carried by existing IP packets (e.g., in a header portion of the packets). Thus, in cases where sufficient traffic exists for a given network 108, probe 112 and associated elements might not be necessary as such information can be discovered via existing traffic. However, due to the aforementioned "first use" issue and the stale issue, probe 112 can be advantageous, particularly to discover such ECN data when a new network connection is established or to update ECN data for persistent connections that have been established but not used. In certain other situations, probe 112 might not be necessary.

Thus, in some embodiments, probe 112 can be transmitted in response to establishing connection 202 or another communication session between mobile device 100 and access point device 104. In this case, known first use issues can be mitigated, as probe 112 that can facilitate discovery of ECN data can be launched whenever the mobile device 100 connects to a given network 108.

Additionally, or alternatively, mobile device 100 and/or connection manager 102 can include probe timer 410, which can be utilized in connection with transmitting probe 112. For example, probe 112 can be transmitted in response to expiration of probe timer 410. Hence, probe 112 need only be initiated after a defined period of time has elapsed, which can be any suitable period of time, for example about 15 minutes, which can mitigate stale use issues. It is appreciated probe timer 410 can be reset periodically to prevent expiration in case certain conditions arise or events occur. For example, if sufficient ECN data is received at mobile device 100, then probe 112 is not necessary and can be delayed by resetting probe timer 410. Such ECN data might be received via response 116 (e.g., initiated due to a new connection) or via sufficient network traffic. If either condition arises, probe timer 410 can be reset. However, if no sufficient ECN data has been received for the period of probe timer 410 (e.g., 15 minutes), then probe timer 410 can expire, activating probe 112.

Methods for Probing a Network for Discovering ECN-Based Congestion Data

Figure 5:
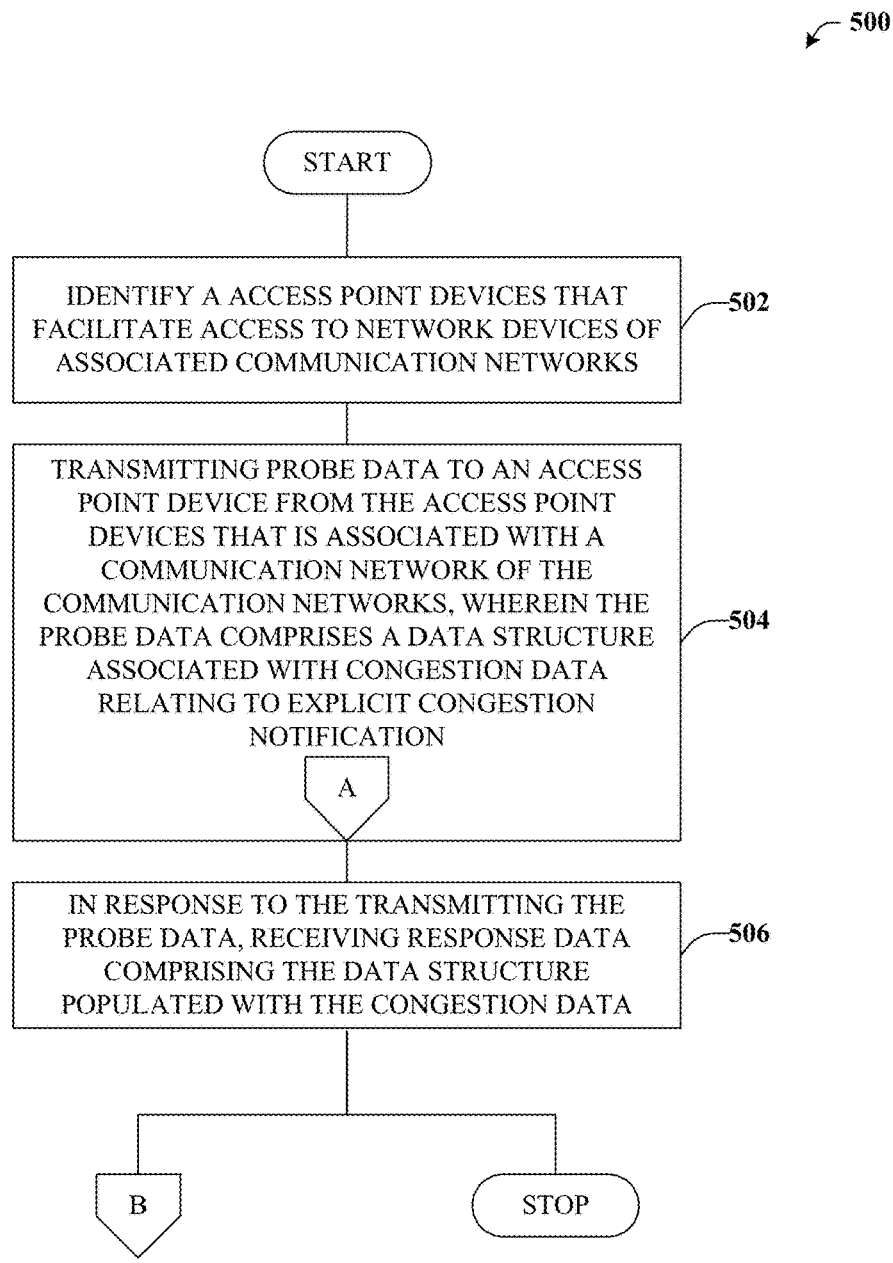
FIG. 5 illustrates an example methodology that can provide for utilizing a probe for discovering ECN-based congestion data in accordance with certain embodiments of this disclosure.
Figure 6:
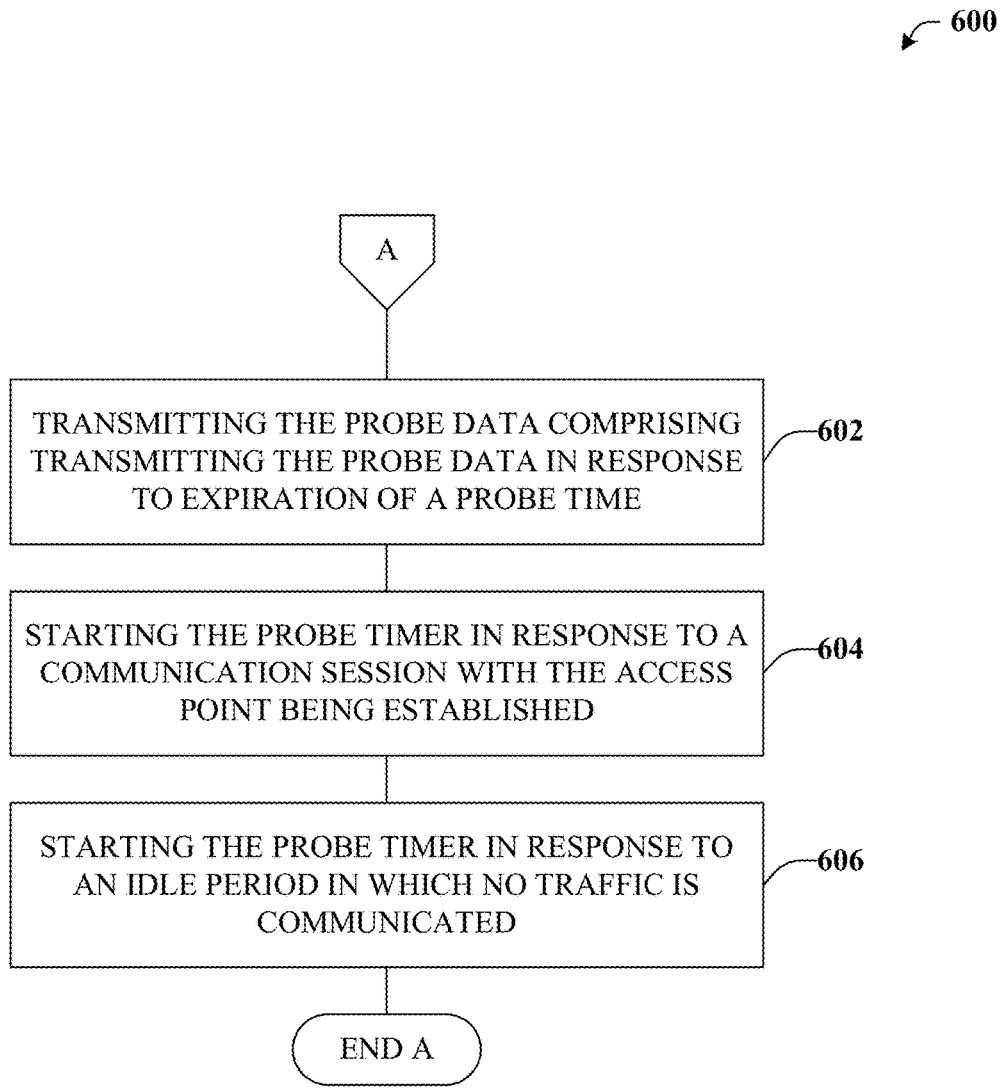
FIG. 6 illustrates an example methodology that can provide for additional features or aspects in connection with transmitting probe data to an access point device in accordance with certain embodiments of this disclosure.
Figure 7:
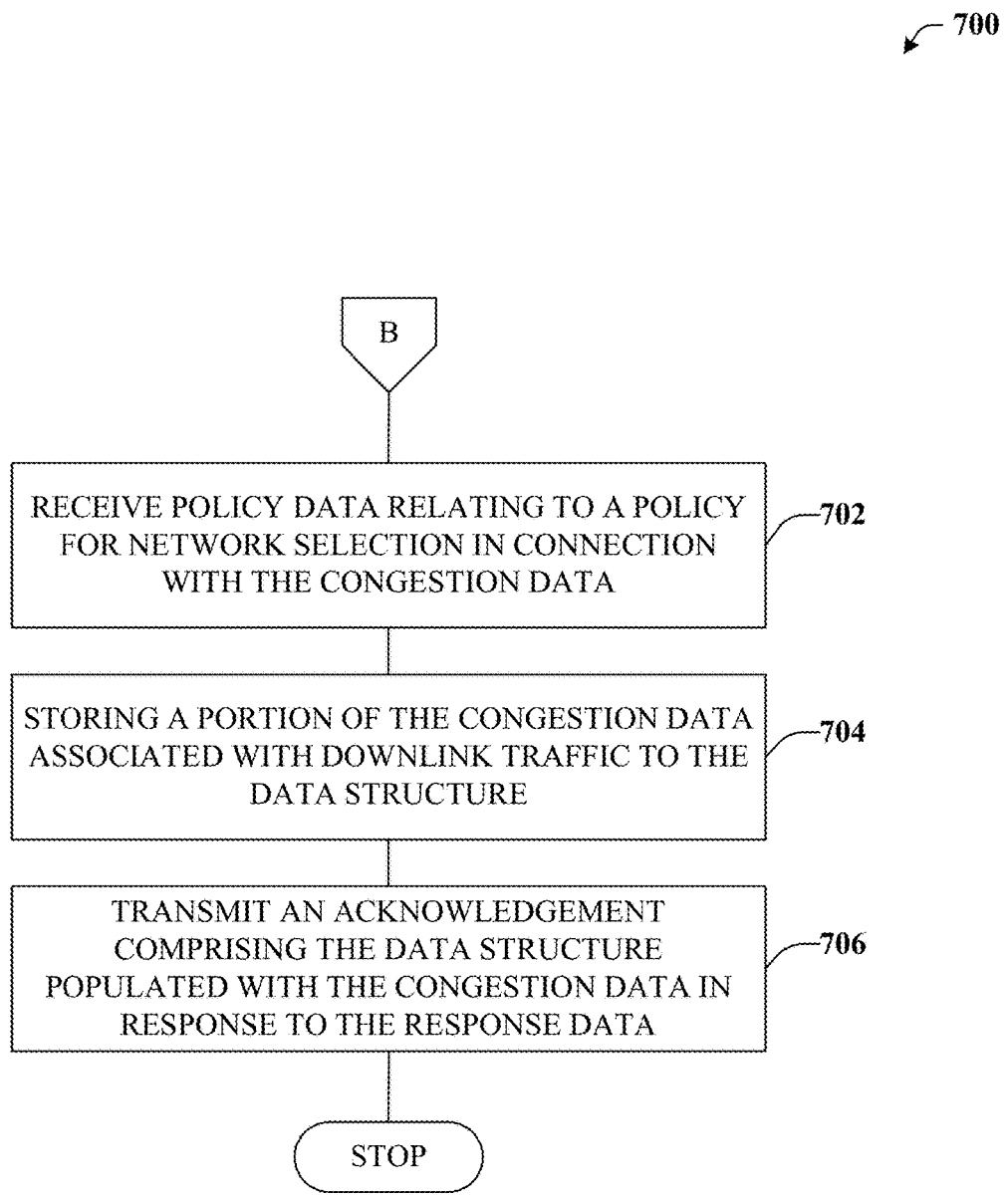
FIG. 7 illustrates an example methodology that can provide for additional aspect or features in connection with using a probe for ECN-based congestion data discovery in accordance with certain embodiments of this disclosure.

FIGS. 5-7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 5, exemplary method 500 is depicted. Method 500 can provide for utilizing a probe for discovering ECN-based congestion data. For example, at reference numeral 502, various networks can be identified. The access point devices of these various networks can facilitate access to network devices (e.g., a server or gateway devices in a core portion of an associated network) of associated communication networks. In some embodiments, access point devices can be access point devices that are in range and/or available to serve a mobile device or other user equipment. In some embodiments, the access point devices can be access point devices with which the mobile device or other user equipment has established a connection or has a, potentially persistent, communication session.

At reference numeral 504, probe data can be transmitted to a network device (e.g., one probe for each existing network). The probe data can be delivered to the network device via an associated access point device. The probe data can include information suitable for determining congestion state for an adjacent portion of the communication network (e.g., time stamps or other timing information, quality of service indicators, etc.) as well as a data structure associated with congestion data relating to ECN. Method 500 can proceed to insert A, which is detailed in connection with FIG. 6, or continue to reference numeral 506.

At reference numeral 506, network server sends acknowledgement message which can be received by the mobile device in response to transmitting the probe data detailed at reference numeral 502. The acknowledgement message can comprise the data structure that is populated with the congestion data. In other words, the data structure can include updated congestion data that has been marked by various entities in the communication network with updated data. Method 500 can proceed to insert B or end.

Turning now to FIG. 6, exemplary method 600 is illustrated. Method 600 can provide for additional features or aspects in connection with transmitting probe data to an access point device. For example, method 600 can initially proceed to reference numeral 602. At reference numeral 602, transmitting the probe data detailed in connection with reference numeral 504 of FIG. 5 can include transmitting the probe data in response to expiration of a probe timer. For example, if the probe timer ticks for thirty minutes (or another defined period), then probe data can be transmitted every thirty minutes unless the probe timer has been reset due to satisfying certain conditions such as receiving sufficient ECN data.

At reference numeral 604, the probe timer can be started in response to a communication session with the access point device being established. It is appreciated that probe data can be transmitted in response to a communication session with the access point device being established. Thus, upon establishing a communication session with the access point device, probe data can be transmitted, and responses received can be used to update network congestion indicators and the probe timer started such that after expiration, a new probe can be sent.

At reference numeral 606, the probe timer can be started or reset in response to an idle period in which no traffic is communicated via the communication network. If no traffic occurs over the communication network, then it is unlikely that ECN-based congestion data will have been received. Accordingly, during such a period, transmitting probe data can be useful in updating the congestion data. If such data is received while probe timer is ticking, then probe timer can be reset.

Referring now to FIG. 7, exemplary method 700 is illustrated. Method 700 can provide for additional aspect or features in connection with using a probe for ECN-based congestion data discovery. Method 700 can initially proceed to reference numeral 702. At reference numeral 702, policy data can be received from the network device and/or from the access point device. The policy data can relate to a policy for network selection in connection with the congestion data that is received in response to the probe data, etc. It is understood that receiving policy data is generally not directly tied to probe data. For example, policy data updates might occur very infrequently (e.g., once a month, or based on management changes), whereas probes might be frequently transmitted (e.g., several times per day, several times per hour, etc.).

Regardless, once a response to the probe data is received, such data can indicate congestion states for various uplink and downlink segments of the communication network. Upon receiving the response, at reference numeral 704, a portion of the congestion data associated with downlink traffic (e.g., from the access point device to the mobile device) can be determined and stored to the data structure. Thus, the data structure can include complete congestion data for all relevant segments of the communication network, both uplink and downlink.

At reference numeral 706, an acknowledgement can be transmitted to the network device and/or the access point device. The acknowledgement can include the fully updated data structure populated with the congestion, which can operate to provide the full data to other elements of the communication network. The acknowledgement can be transmitted in response to the response data.

Example Operating Environments

Figure 8:
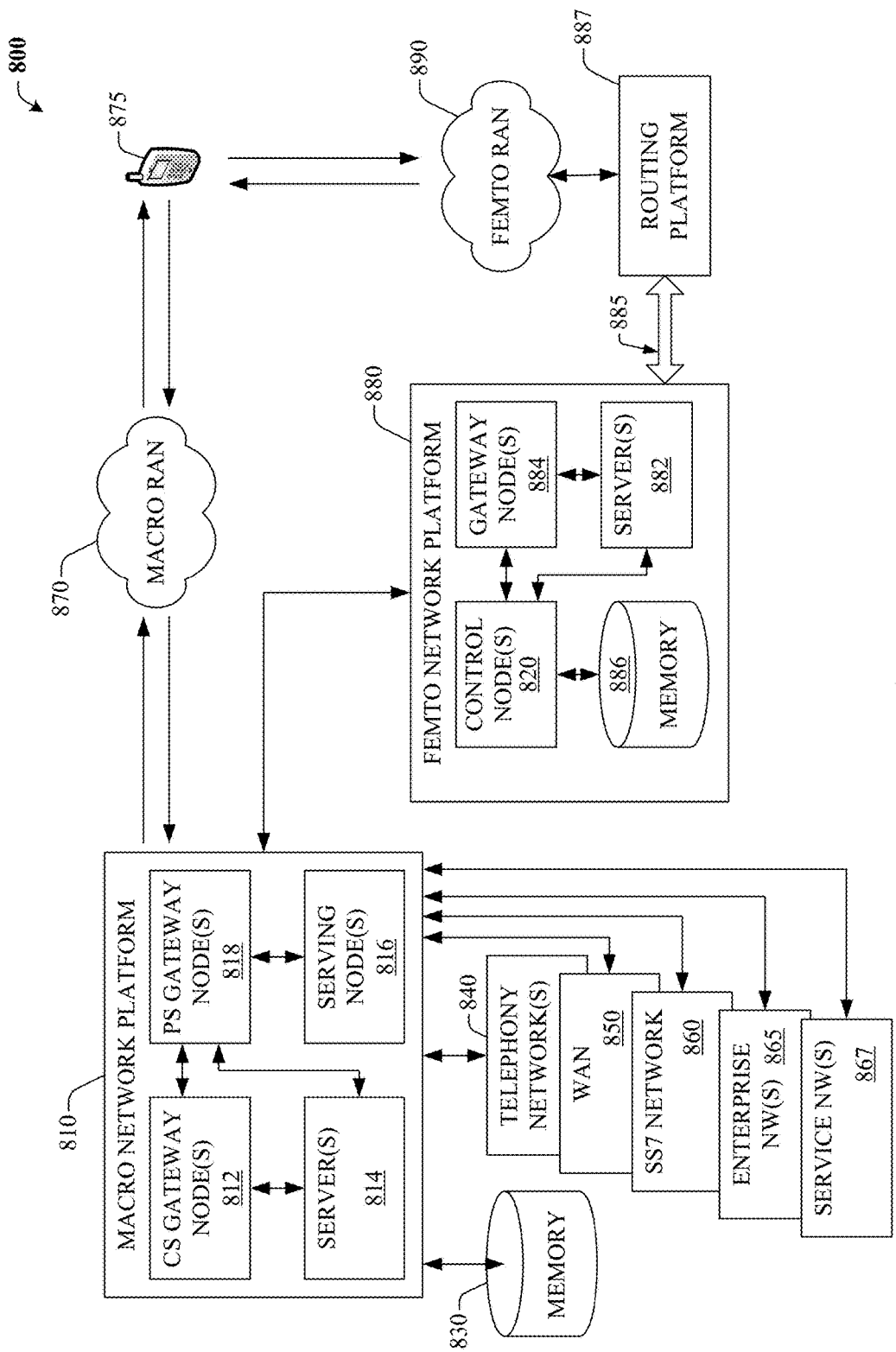
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 includes two wireless network platforms: (i) A macro network platform 810 that serves, or facilitates communication) with user equipment 875 via a macro radio access network (RAN) 870. It should be appreciated that in cellular wireless technologies (e.g., 4G, 3GPP UMTS, HSPA, 3GPP LTE, etc.), macro network platform 810 is embodied in a Core Network. (ii) A femto network platform 880, which can provide communication with UE 875 through a femto RAN 890, linked to the femto network platform 880 through a routing platform 82 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 810 includes CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can include traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also includes serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can include one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can include business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also include substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based, frame relay-based, ATM-based) it generates in addition to data received from macro network platform 810. It is to be noted that server(s) 882 can include one or more processor configured to confer at least in part the functionality of macro network platform 810. To that end, the one or more processor can execute code instructions stored in memory 886, for example.

Memory 886 can include information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
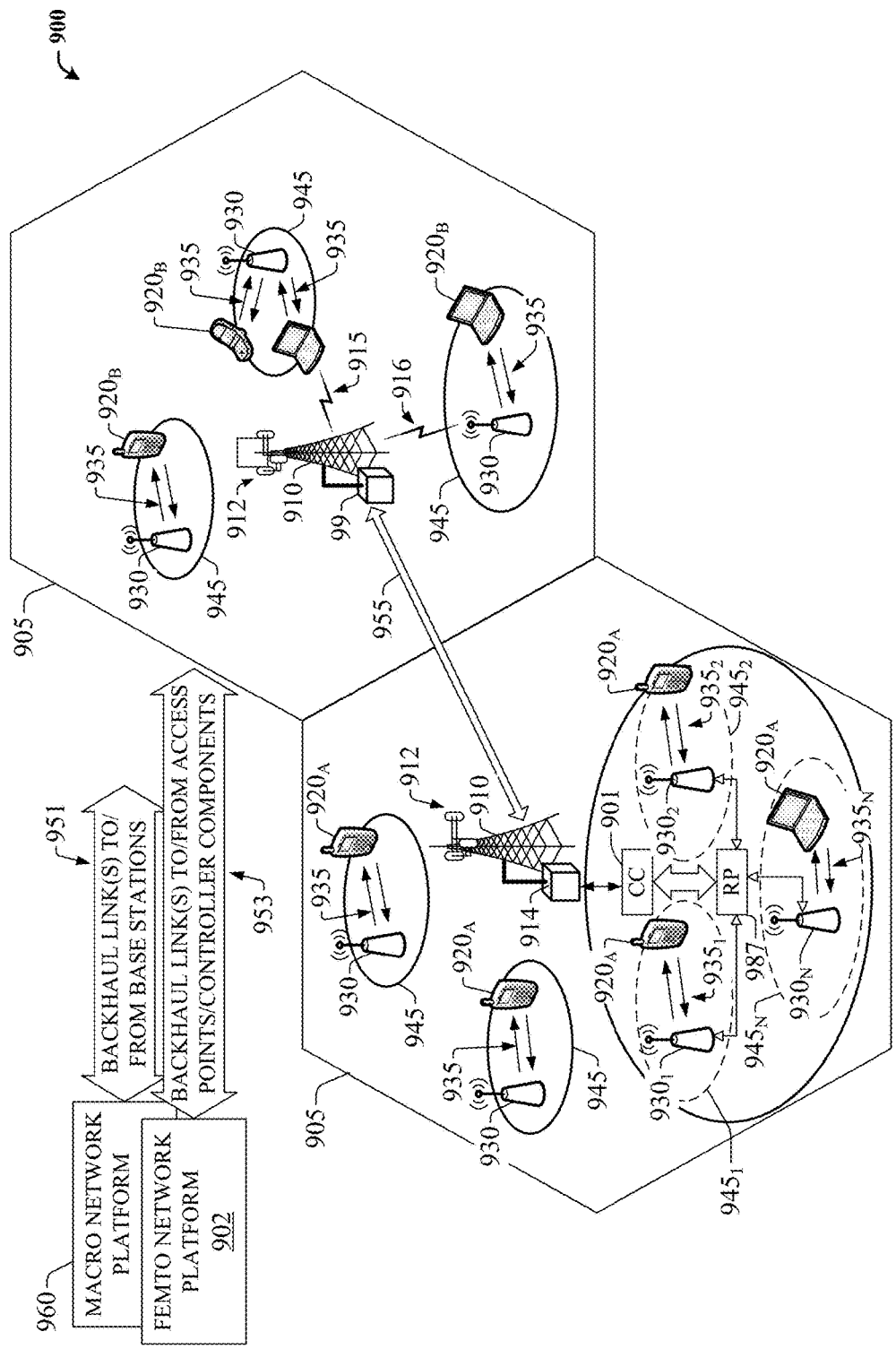
FIG. 9 illustrates a second example of a wireless communications environment with associated components that can be operable to execute certain embodiments of this disclosure.

FIG. 9 illustrates a wireless environment that includes macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can include functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $10^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), LTE, UMTS, HSPA, HSDPA, HSUPA, or LTE Advanced. Moreover, substantially all aspects of the subject innovation can include legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$12_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 includes a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (01-DM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
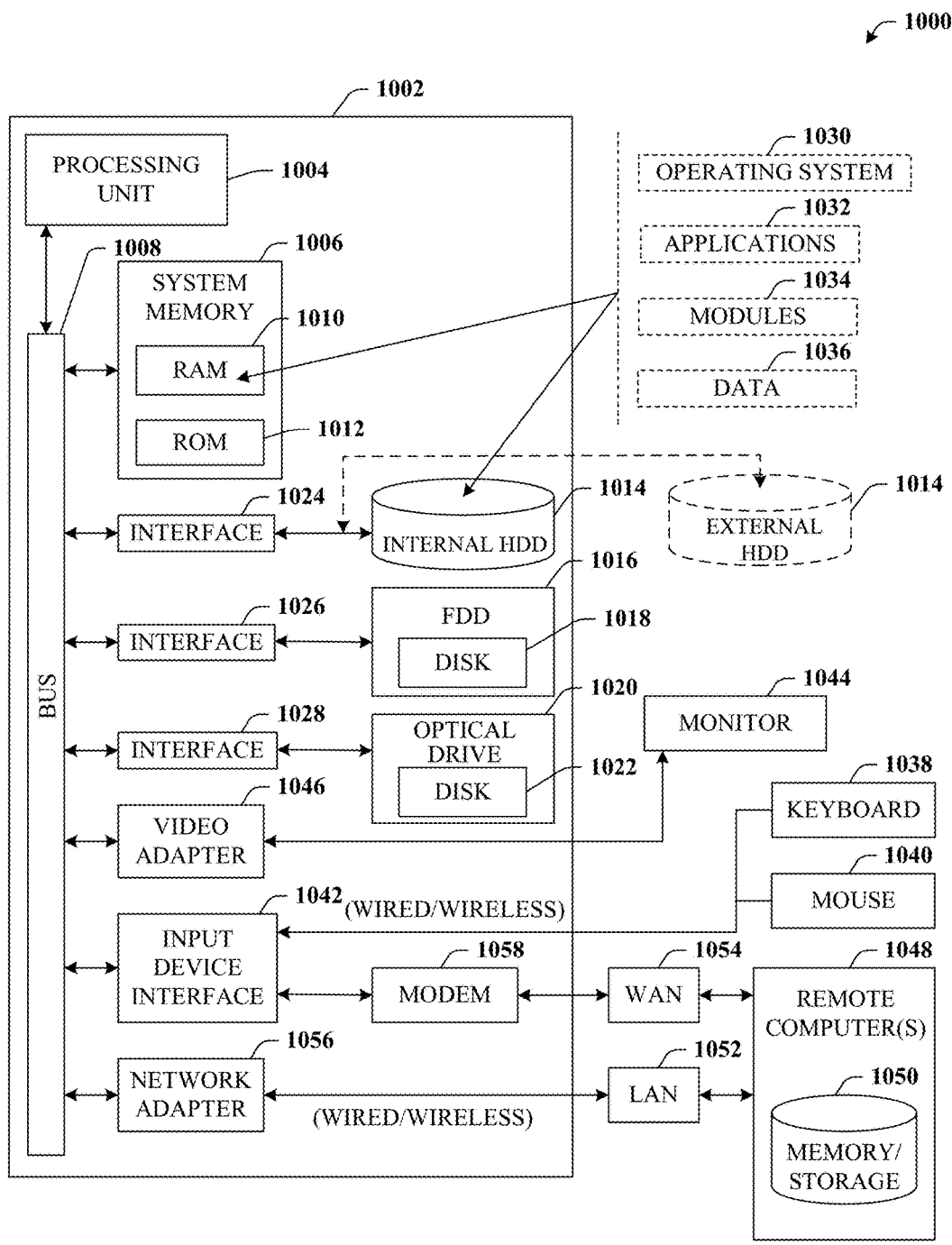
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at a 10 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A user equipment device, comprising:
   a processor; and
   a memory that stores executable instructions that, when executed by the processor, facilitate performance of operations, comprising:
   determining that the user equipment device is attached to a group of access point devices, wherein the group comprises a first access point device of a first network that operates according to a first communication protocol and a second access point device of a second network that operates according to a second communication protocol different than the first communication protocol;
   determining that communication between the user equipment device and the first access point device is below a defined threshold indicative of an initial use situation, wherein the initial use situation is representative of data traffic between the user equipment device and the first access point device being determined, according to a defined function, to be insignificant since the user equipment device attached to the first access point device;
   in response to the determining that the communication is below the defined threshold, transmitting an uplink probe comprising a first aggregate data structure to a network device of the first network via the first access point device;
   in response to the transmitting the uplink probe, receiving, via the first access point device, a downlink probe from the network device, wherein the downlink probe comprises the first aggregate data structure populated with values representative of first congestion states between respective first node devices of a communication path from the network device and the user equipment device; and selecting the first network for communication of data of an application executing on the user equipment device in response to a comparison of the first aggregate data structure to a second aggregate data structure that is representative of second congestion states of second node devices of the second network.

2. The user equipment device of claim 1, wherein the first communication protocol is a first member of, and the second communication protocol is a second member of, a protocol group comprising: a long term evolution protocol, a third generation partnership project protocol, a second generation partnership project protocol, a wireless fidelity protocol, and a worldwide interoperability for microwave access protocol.

3. The user equipment device of claim 1, wherein the determining the communication is below the defined threshold comprises determining that a stale use situation exists, and wherein the stale use situation is representative of data traffic between the user equipment device and the first access point device being determined, according to the defined function, to be insignificant for a defined period of time.

4. The user equipment device of claim 1, wherein the first aggregate data structure comprises a value indicative of a congestion state for uplink traffic between the user equipment device and the first access point device.

5. The user equipment device of claim 1, wherein the first aggregate data structure comprises a value indicative of a congestion state for uplink traffic between the first access point device and the network device.

6. The user equipment device of claim 1, wherein the first aggregate data structure comprises a value indicative of a congestion state for downlink traffic between the network device and the first access point device.

7. The user equipment device of claim 1, wherein the first aggregate data structure comprises a value indicative of a congestion state for downlink traffic between the first access point device and the user equipment device.

8. The user equipment device of claim 1, wherein the operations further comprise, in response to the receiving the downlink probe, transmitting a portion of the first aggregate data structure to the network device.

9. The user equipment device of claim 8, wherein the portion comprises a first value indicative of a first congestion state of first downlink traffic between the network device and the first access point device and a second value indicative of a second congestion state of second downlink traffic between the first access point device and the user equipment device.

10. The user equipment device of claim 9, wherein the determining the second value comprises determining the second value based on data associated with the receiving the downlink probe, and wherein the data comprises at least one of first data representing time stamp information, second data representing packet loss information, third data representing packet retransmission information, or fourth data representing packet transmission performance information.

11. A non-transitory machine-readable storage medium, comprising executable instruction that, when executed by a processor, facilitate performance of operations, comprising:

determining that a user equipment device is attached to a group of access point devices, wherein the group comprises a first access point device of a first network that operates according to a first communication protocol and a second access point device of a second network that operates according to a second communication protocol different than the first communication protocol;

determining that communication between the user equipment device and the first access point device is below a traffic threshold indicating that an initial use situation exists, wherein the initial use situation is representative of data traffic between the user equipment device and the first access point device being determined, according to a defined function, to be insignificant since the user equipment device attached to the first access point device;

in response to the determining that the communication is below the traffic threshold, transmitting an uplink probe comprising a first aggregate data structure to a network device of first network devices of the first network via the first access point device;

in response to the transmitting the uplink probe, receiving, via the first access point device, a downlink probe from the network device, wherein the downlink probe comprises the first aggregate data structure that stores values representative of first congestion states between respective first node devices of a communication path from the network device and the user equipment device; and selecting the first network devices of the first network as candidates for communication of data of an application executing on the user equipment device in response to a comparison of the first aggregate data structure to a second aggregate data structure that is representative of second congestion states of second network devices of the second network.

12. The non-transitory machine-readable storage medium of claim 11, wherein the determining the communication is below the traffic threshold comprises determining that a stale use situation exists, and wherein the stale use situation is representative of data traffic between user equipment device and the first access point device being determined to be statistically insignificant for a defined period of time.

13. The non-transitory machine-readable storage medium of claim 11, wherein the first aggregate data structure comprises a first value indicative of a first congestion state for first uplink traffic between the user equipment device and the first access point device, a second value indicative of a second congestion state for second uplink traffic between the first access point device and the network device, a third value indicative of a third congestion state for first downlink traffic between the network device and the first access point device, and a fourth value indicative of a fourth congestion state for second downlink traffic between the first access point device and the user equipment device.

14. The non-transitory machine-readable storage medium of claim 13, wherein the operations further comprise, in response to the receiving the downlink probe, transmitting a portion of the first aggregate data structure to the network device, and wherein the portion comprises the third value and the fourth value.

15. The non-transitory machine-readable storage medium of claim 11, wherein the operations further comprise, in response to the receiving the downlink probe, transmitting a portion of the first aggregate data structure to the network device.

16. The non-transitory machine-readable storage medium of claim 15, wherein the portion comprises a first value indicative of a first congestion state of first downlink traffic between the network device and the first access point device and a second value indicative of a second congestion state of second downlink traffic between the first access point device and the user equipment device.

17. The non-transitory machine-readable storage medium of claim 15, wherein the determining the second value comprises determining the second value based on data associated with the receiving the downlink probe, and wherein the data comprises at least one of first data representing time stamp information, second data representing packet loss information, third data representing packet retransmission information, or fourth data representing packet transmission performance information.

18. A method, comprising:
   determining, by a device comprising a processor, that a user equipment device is attached to a group of access point devices, wherein the group comprises a first access point device of a first network that operates according to a first communication protocol and a second access point device of a second network that operates according to a second communication protocol different than the first communication protocol;
   determining, by the device, that communication between the user equipment device and the first access point device is below a defined threshold indicative of an initial use situation, wherein the initial use situation is representative of data traffic between the user equipment device and the first access point device being determined, according to a defined function, to be insignificant since the user equipment device attached to the first access point device;
   transmitting, by the device, an uplink probe to a network device of the first network via the first access point device in response to the determining that the communication is below the defined threshold, wherein the uplink probe comprises a first aggregate data structure;
   receiving, by the device, a downlink probe from the network device, wherein the downlink probe comprises the first aggregate data structure populated with values representative of first congestion states between first nodes of a communication path from the network device and the user equipment device; and
   in response to a comparison of the first aggregate data structure to a second aggregate data structure that is representative of second congestion states of second nodes of the second network, selecting, by the device, the first network to communicate data of an application executed by the user equipment device.

19. The method of claim 18, wherein the determining the communication is below the defined threshold comprises determining that a stale use situation exists, and wherein the stale use situation is representative of data traffic between user equipment device and the first access point device being immaterial for a defined period of time.

20. The method of claim 18, wherein the first aggregate data structure comprises a first value indicative of a first congestion state for first uplink traffic between the user equipment device and the first access point device, a second value indicative of a second congestion state for second uplink traffic between the first access point device and the network device, a third value indicative of a third congestion state for first downlink traffic between the network device and the first access point device, and a fourth value indicative of a fourth congestion state for second downlink traffic between the first access point device and the user equipment device.

* * * * *